(12) United States Patent
Patel et al.

(10) Patent No.: US 11,271,944 B2
(45) Date of Patent: Mar. 8, 2022

(54) AUTHENTICATION FRAMEWORK TO ENFORCE CONTRACTUAL GEOGRAPHICAL RESTRICTIONS

(71) Applicant: KYNDRYL, INC., New York, NY (US)

(72) Inventors: Pritesh Patel, Raleigh, NC (US);
Shikhar Kwatra, Durham, NC (US);
Joseph Kozhaya, Wake, NC (US);
Anantha S. Rao, Cary, NC (US);
Craig Cook, Raleigh, NC (US)

(73) Assignee: Kyndryl, Inc., New York, NY (US)

( * ) Notice: Subject to any disclaimer, the term of this patent is extended or adjusted under 35 U.S.C. 154(b) by 378 days.

(21) Appl. No.: 16/445,260

(22) Filed: Jun. 19, 2019

(65) Prior Publication Data

US 2020/0404002 A1    Dec. 24, 2020

(51) Int. Cl.
*G06F 40/30* (2020.01)
*H04L 29/06* (2006.01)

(52) U.S. Cl.
CPC ............ *H04L 63/107* (2013.01); *G06F 40/30* (2020.01); *H04L 63/08* (2013.01); *H04L 63/20* (2013.01)

(58) Field of Classification Search
CPC ....... H04L 63/08; H04L 63/107; H04L 63/20; G06F 40/30; G06F 40/20; G06F 21/6218; G06F 2221/2111

USPC .......................................................... 726/1
See application file for complete search history.

(56) References Cited

U.S. PATENT DOCUMENTS

| | | | |
|---|---|---|---|
| 6,691,032 B1 | 2/2004 | Irish et al. | |
| 7,792,297 B1 | 9/2010 | Piccionelli et al. | |
| 8,149,113 B2 | 4/2012 | Diem | |
| 8,220,034 B2 | 7/2012 | Hahn | |
| 9,013,333 B2 | 4/2015 | Morgan et al. | |
| 9,367,688 B2 * | 6/2016 | Smith | H04W 12/06 |
| 9,781,602 B1 | 10/2017 | Girdhar et al. | |
| 9,817,101 B2 * | 11/2017 | Jones | G01S 5/02 |
| 10,489,387 B1 * | 11/2019 | Rogynskyy | G06F 16/9535 |
| 2006/0128397 A1 | 6/2006 | Choti | |
| 2009/0100260 A1 | 4/2009 | Govindarajan | |
| 2012/0208549 A1 | 8/2012 | Lau et al. | |
| 2013/0246326 A1 | 9/2013 | Graupner | |
| 2016/0195602 A1 | 7/2016 | Meadow | |

\* cited by examiner

*Primary Examiner* — Benjamin A Kaplan
(74) *Attorney, Agent, or Firm* — Schmeiser, Olsen & Watts, LLP; Ken Han

(57) ABSTRACT

Natural language contractual geographic resource restrictions (CGRR) are converted by computer into a set of machine logic based rule(s), and then the set of machine logic based rule(s) is used to control access to a set of computing resources in accordance with the CGRR in the operative contract. In some embodiments, the CGRR restrict access based on the geography of the prospective user, or customer, of the computing resources.

12 Claims, 6 Drawing Sheets

AUTHENTICATION FRAMEWORK TO ENFORCE CONTRACTUAL GEOGRAPHICAL RESTRICTIONS

BACKGROUND

The present invention relates generally to the field of Contractual Geographical Resource Restrictions (CGRR).

CGRR are hereby defined as any contractual terms that restrict, control or deny computing resources based at least in part on geography. The relevant geography may be the geography of the prospective consumer of the resources (or, for example, the prospective consumer's employer, the geography of server computer(s) that are used to deliver the computing resources, the geography of humans involved in generating the computing resources (for example, coders who coded a program, actors that appear in a streaming movie) or the geography of any entity or action that relates in any way to the computing resources and/or their provision. A CGRR may be absolute (for example, "persons located in the United States are forbidden from accessing the data") or relative (for example, "the data may only be accessed if the prospective consumer and the server upon which it is hosted are located in the same prefecture").

"Computing resources" is hereby defined to include at least the following types of computing resources: processing of data; short-term storage of data (for example, memory); long-term storage of data (for example, storage on a disk drive array); access to and/or revision of stored data; streaming content (for example, text, images, video, audio); downloadable content; physical computing resources; virtualized resources; and/or software.

SUMMARY

According to an aspect of the present invention, there is a method, computer program product and/or system that performs the following operations (not necessarily in the following order): (i) receiving a contract data set including information indicative of the text of a natural language contract that controls the terms of access by a first set of user(s) to a first computing resource, with the contract including a set of contractual geographical resource restriction(s) (CGRR(s)); (ii) applying natural language parsing to the contract data set to convert the set of CGRR(s) into a set of machine logic rule(s) that control access to the first computing resource in accordance with the set of CGRR(s); (iii) receiving, from a device of a first user of the first set of users, a first request to access the first computing resource; and (iv) applying the machine logic rule(s) to determine an extent to and/or manner in which the first user can access the first computing resource.

DETAILED DESCRIPTION

Figure 1:
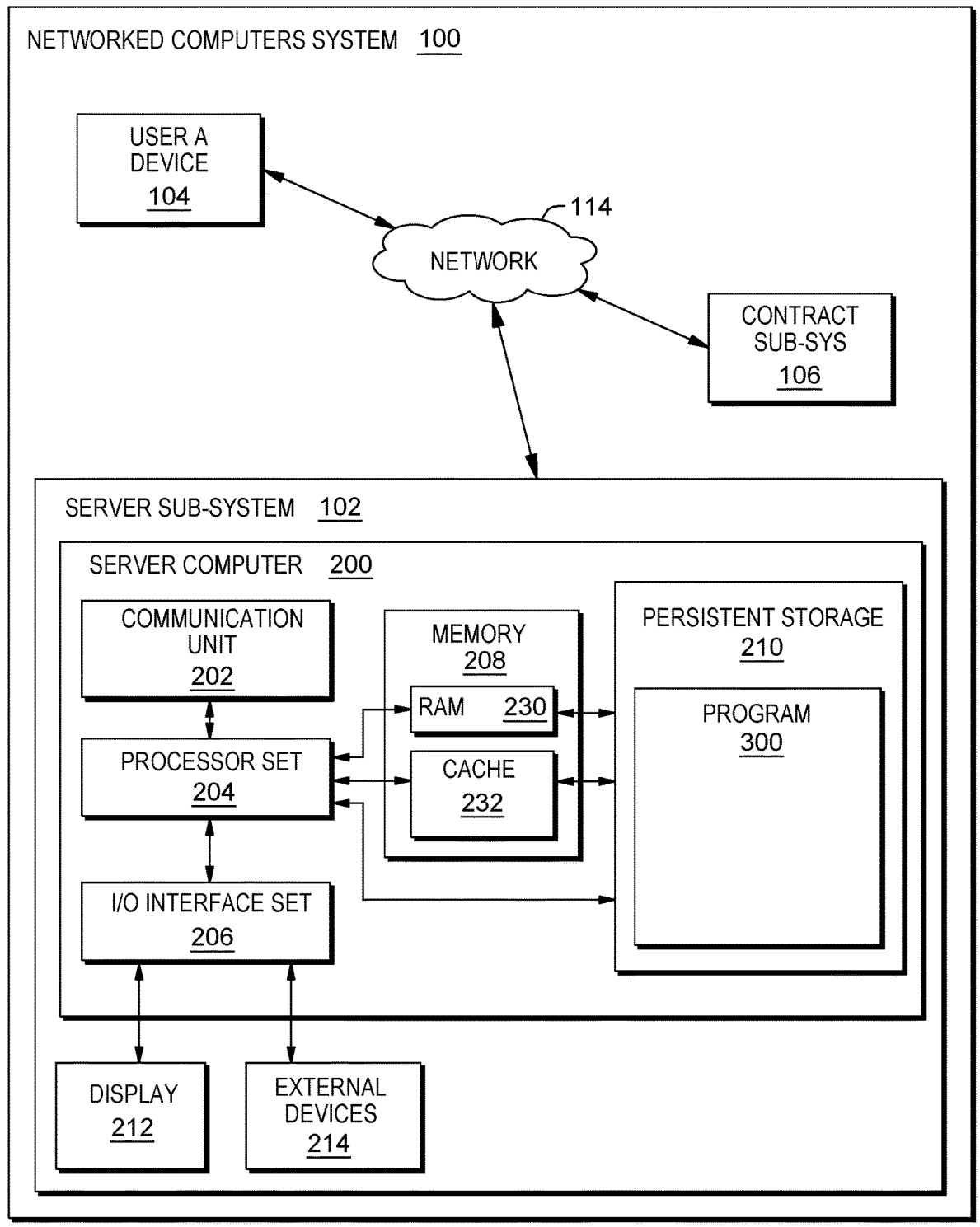
FIG. 1 is a block diagram view of a first embodiment of a system according to the present invention.

According to some embodiments of the present invention, a natural language contractual geographic resource restrictions (CGRR) are converted by computer into a set of machine logic based rule(s), and then the set of machine logic based rule(s) is used to control access to a set of computing resources in accordance with the CGRR in the operative contract. In some embodiments, the CGRR restrict access based on the geography of the prospective user, or customer, of the computing resources.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; User A device 104; contract sub-system 106; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
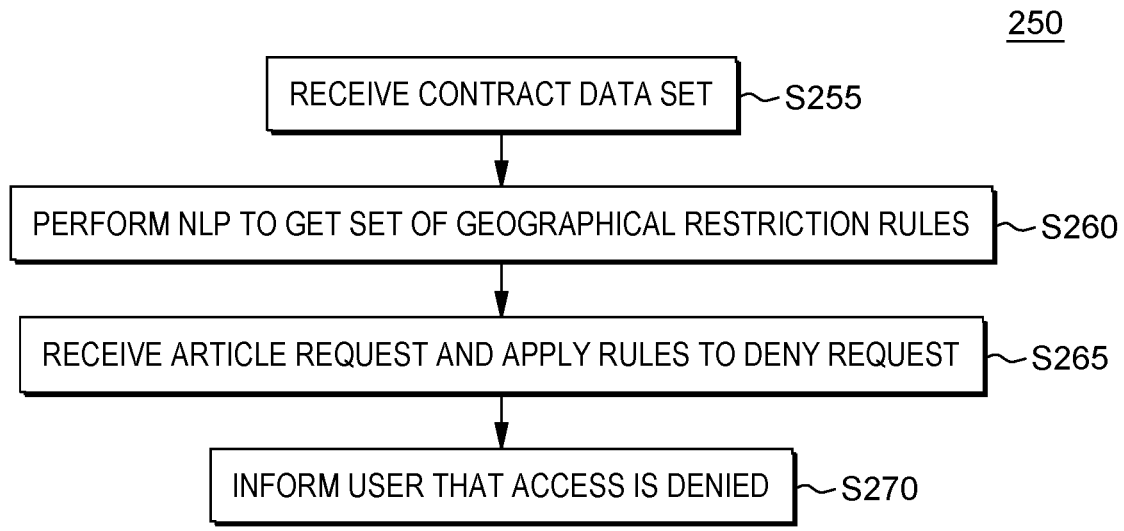
FIG. 2 is a flowchart showing a first embodiment method performed, at least in part, by the first embodiment system.
Figure 3:
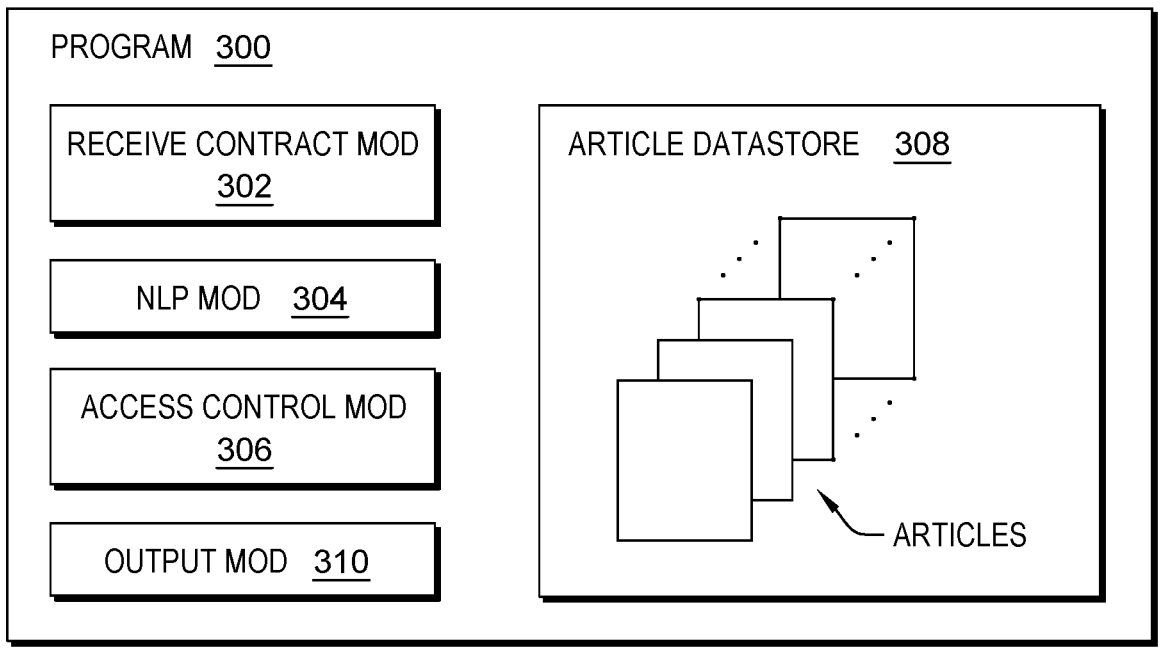
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive contract module ("mod") 302 receives a natural language contract (that is, a contract written in natural language) as a machine readable data set from contract sub-system 106 through communication network 114 (see FIG. 1). This data set is herein referred to a contract data set. In this example, the natural language contract is represented as machine readable ASCII code representing the following contract:

User Abel and Binghamton Media Company hereby agree that in exchange for the sum of one hundred dollars paid by User Abel to Binghamton Media Company, User Abel will be allowed online access to all articles in the Binghamton Media Company database where the subject matter content of the article has taken place in Binghamton, N.Y. (New York); Vestal, N.Y.; Endicott, N.Y. or Johnson City, N.Y. There will be no access to articles whose subject matter content has taken place in other cities that do not include the enumerated cities of the previous sentence.

It is noted that the above contract includes a geographical restriction because only articles relating to certain enumerated cities (that is, certain geographical areas) can be accessed by User Abel in exchange for her $100 payment. As will be seen in the following sub-section of this detailed Description section, the geographical restriction may be a restriction on other entities or subject matter related to the content, such as the geography where the user must be located to access certain data and/or computing functionality.

Processing proceeds to operation S260, where natural language processing (NLP) mod 304 applies natural language processing to the natural language of the contract to write machine language rules to apply the geographic restriction. In this example, three geographical restriction rules result from this NLP as follows: (i) if User Abel requests an article where the article metadata indicates that the article is about events happening in Binghamton, Johnson City, Vestal or Endicott, then User Abel is granted access to the requested article; (ii) if User Abel requests an article where the article content mentions Binghamton, Johnson City, Vestal or Endicott, then User Abel is granted access to the requested article; and (iii) if neither of the foregoing two rules apply, then User Abel is denied access to the article and is presented with an opportunity to pay for an expanded subscription in order to unlock the requested article for her. (See screenshot 400 in FIG. 4.)

Processing proceeds to operation S265, where User Abel (see User A device 104) requests an article entitled "Broken Sewer Main Causes Staten Island Flood" through communication network 114 from access control mod 306. Access control mod 306 applies the three geographical restriction access rules as will be respectively described in the following three paragraphs.

First, the metadata of the article is checked to determine that the subject matter of the article has taken place in New York City. Because this metadata does not include Binghamton, Johnson City, Endicott or Vestal, the first machine logic rule of this example, does not allow User Abel to have access to the article she has requested.

Second, the content of the article is checked to whether the article mentions Binghamton, Vestal, Endicott or Johnson City. The only geographic location mentioned by name in the requested article is Staten Island because that is where the flood occurred. Accordingly, the second machine logic rule of this example, does not allow User Abel to have access to the article she has requested.

Third, because the first two rules do not allow User Abel access to the article, the third machine logic rule dictates that User Abel will be denied access to the article (stored in data store 308).

Figure 4:
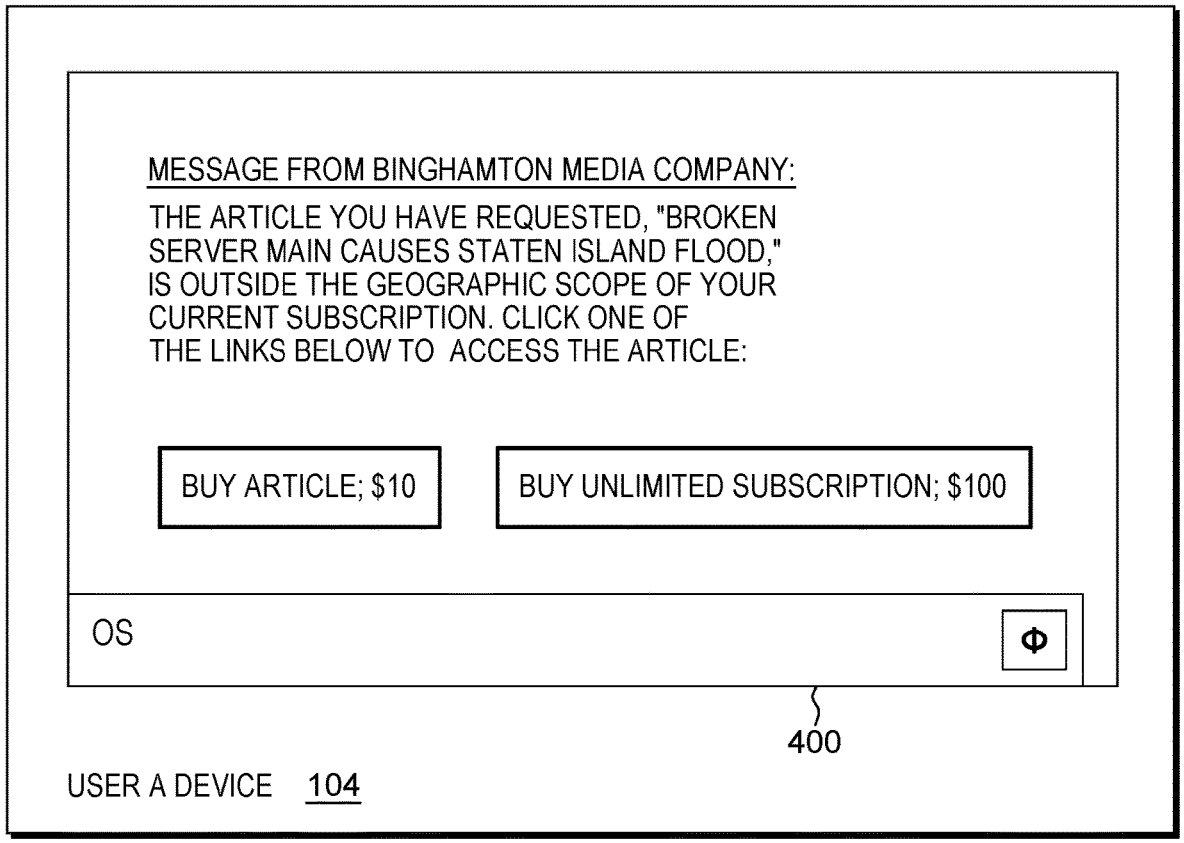
FIG. 4 is a screenshot view generated by the first embodiment system.

Processing proceeds to operation S270, where output mod 310 outputs a message to User Abel's device 104 indicating that she cannot access the article unless she pays an additional ten dollars because the requested article is outside of the geographic scope of the access to articles that she has thus far purchased from the Binghamton Media Company (as shown in screenshot 400 of FIG. 4).

III. Further Comments and/or Embodiments

A problem statement will now be discussed. Current authentication solutions for system access do not take into account Contractual Global Resource Restrictions (CGRR). Moreover, the tracking and identification of Global Restrictions documented within Contracts is a manual error-prone task as well. System administrators and other users are often notified by e-mail of access restrictions where only employees within specified countries should be able to login to customer systems. However, this is a very manual and highly flawed process as there is simply no systematic or dynamic enforcement to ensure that unauthorized access is blocked, and the customer contractual requirement is fulfilled. Additionally, current solutions focus on utilizing Groups to manage systems and data accessibility. This traditional and very manual methodology is insufficient to meet the requirements as users can have access to a group, but may relocate or travel and still retain access to the restricted systems.

Some embodiments of the present invention may include one, or more, of the following features, characteristics and/or advantages: (i) focuses on adding an element of automated contractual enforcement of user restrictions via location based authentication; (ii) the interpretation, consumption and enforcing the contractual global restrictions that can be consumed at the time of authentication; (iii) utilizes the location based information to manage authentication attempts and enforcing access restrictions based on contractual requirements; and/or (iv) leverages the above mentioned capability, but furthers it by actually developing a Global Restriction Rule Set that, when applied with key organizational tools, can be used to monitor and enforce user access.

Some embodiments of the present invention include one, or more, of the following features, characteristics, advantages and/or operations: (i) authentication framework to enforce contractual global restrictions; and/or (ii) a global restriction enforcement system (GRES) capable of systematically and dynamically monitoring contract updates and translating any GR constraints into enforceable rule sets that are automatically pushed to customer systems.

Some embodiments of the present invention include one, or more, of the following features, characteristics, advantages and/or operations: (i) as contracts and processes are stored within organizational databases, the language can be analyzed and key terms extracted to generate output for further consumption by machines; (ii) by gathering an ontology of terms pertaining to Access Management and Global Resource Restrictions, some embodiments can dynamically identify when customer contracts and government regulations restrict access to their data or systems; and/or (iii) a possible solution is to automatically and dynamically use the key ontology of words from contracts, to develop an amiable, consumable and unique rule set that is used to monitor and enforce organizational user's access attempts to customer systems based on where the user is located globally.

Key ontology of words utilized to map and identify the rule set below would be included in Table 1 and Table 2 below:

TABLE 1

| PI | PII | GDPR | Global | Restriction |
|---|---|---|---|---|
| Access | EU | EU Only | Personnel | Restrict |
| Residing | Labor | Privacy | Resources | Locations |
| Countries | Customer | Authorized | Resource | Location |
| Country | Supporting | Authorize | Support | Supported |

TABLE 2

| Customer Code | Customer Name | Contract Number or Identifier | Global Restriction Countries |
|---|---|---|---|
| Unique identifier from customer directory | Legal name of the customer | Contract identifier where restriction requirement was retrieved | Define from where users can access this customer's systems. Values can be - Global, EU, US, IN, RO, etc. |
| Ex. CCA | Ex. Bank Canada | Ex. Grr - 1234 | Ex. EU |

Some embodiments of the present invention include one, or more, of the following features, characteristics, advantages and/or operations: (i) each customer would have a rule in place for governance of their system's access; (ii) GRES Service then integrates these rules with an organization's CMDB and Global Restriction Enforcement System (GRES) Agents to monitor all user access attempts; (iii) the GRES agents obtain the IP address of the user attempting to access the system, and depending on the location of the user, either Permits or Denies the access based on the Global Restriction Rule Set that is in place for the customer; (iv) the GRES agent communicates with an organization's CMDB to identify what customer the system ultimately belongs to and thus, can monitor and enforce that customer's Contractual Global Resource Restrictions; and/or (v) the development of the GR Rule Set provides a method to translate contractual language into machine enforceable actions.

In some embodiments, the rule set format is as follows: For all <Customer Code> systems belonging to this <Customer Name>, per <Contract Number>, restrict access to users located in <Global Restriction Countries>.

Some embodiments of the present invention include one, or more, of the following features, characteristics, advantages and/or operations: (i) useful in the Multi-Cloud and Hybrid Cloud environments as its dynamic nature causes frequent addition and removal of systems in customer environments, and that makes enforcement of Global Resource Restrictions even more challenging. GRES solves this long-standing problem; and/or (ii) the GRES solution can eliminate the need for Location Based IAM (Identity and Access Management) Groups that exist in organizations today by enforcing the same level of access, but further enhancing the access management function by considering the true location of the user.

Figure 5:
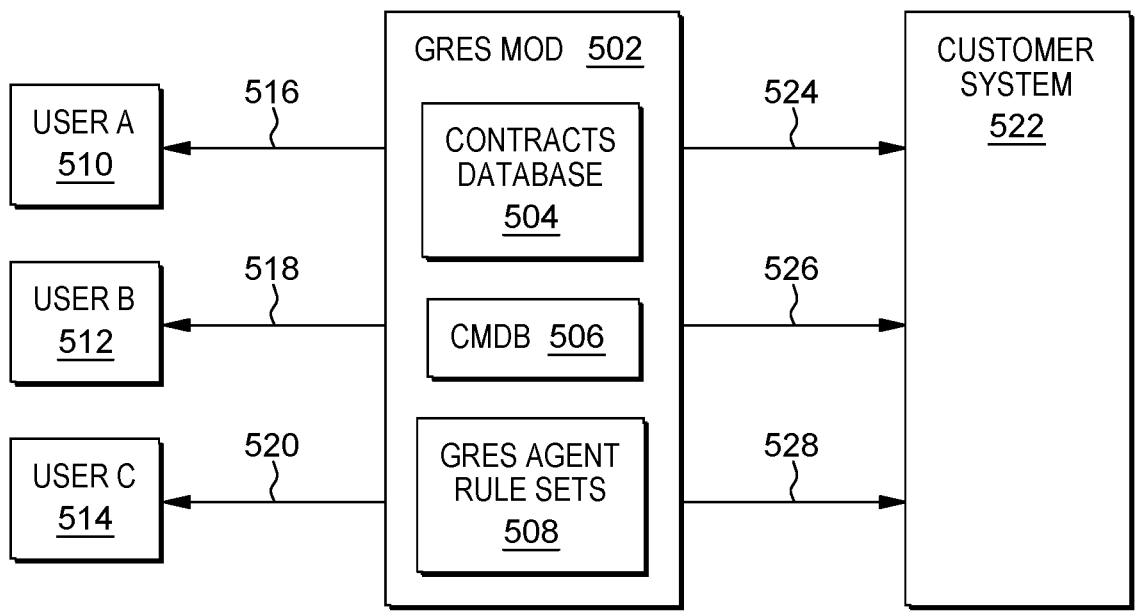
FIG. 5 is a second embodiment of a system according to the present invention.

FIG. 5 shows GRES (global restriction enforcement system) 500 includes: GRES module 502 (including contracts database 504, CMDB (configuration management database) 506 and GRES agent rule sets 508); user A 510 (located in United States); user B 512 (located in Poland); user C 514 (in India); customer system 522; and communication paths 516, 518, 520, 524, 526 and 528. The customer that owns and operates customer system 522 has a unique contractual requirement, allowing access of customer system 522 only to users located in India, the United States or Romania. GRES module 502 is a real time monitoring system that identifies authentication and authorization restrictions in complex customer contracts. GRES module 502 specifically works to interpret these restrictions in unstructured contractual data and translates them into simple rules that can be enforced when users 510, 512, 514 attempt to access customer system 522. Location validation for authentication can be done by IP (internet protocol) address.

Communication path 516 indicates that IAM access passes and GRES module 502 approves access to customer system 522. Communication path 524 indicates this access because user A is located in the United States, which is a contractually permitted nation.

Communication path 518 indicates that IAM access passes and GRES module 502 rejects access to customer system 522. Communication path 526 indicates this denial of access because user B is located in Poland, which is not a contractually permitted nation.

Communication path 520 indicates that IAM access passes and GRES module 502 approves access to customer system 522. Communication path 528 indicates this access because user C is located in the India, which is a contractually permitted nation.

GRES ENFORCEMENT EXAMPLE #1: (1) a customer has a Global Resource Restriction Requirement allowing only users located in the US, India, or Romania access to their systems; (2) United States user attempts to access the customer's system; (3) IAM solution (that is, AD or LDAP) permit the access based on user groups and roles; (4) GRES software agent is monitoring access as well against that customer's GR Rule Set repository; and (5) GRES software agent permits the access as well because the user is accessing the system from an authorized country.

GRES ENFORCEMENT EXAMPLE #2: (1) A customer has a Global Resource Restriction Requirement allowing only users located in the US, India, or Romania access to their systems; (2) Poland user attempts to access the customer's system; (3) IAM solution (i.e. AD or LDAP) permit the access based on user groups and roles; (4) GRES software agent is monitoring access as well against that customer's GR Rule Set repository; and (5) GRES software agent denies the access because the user's IP identifies the user as attempting to access from Poland, which is not an authorized country.

GRES ENFORCEMENT EXAMPLE #3: (1) A customer has a Global Resource Restriction Requirement allowing only users located in the US, India, or Romania access to their systems; (2) A United States user is traveling to Mexico and attempts to access the customer's system; (3) IAM solution (that is, AD or LDAP) permit the access based on user groups and roles; (4) GRES software agent is monitoring access as well against that customer's GR Rule Set repository; and (5) GRES software agent denies the access because the user's IP identifies the user as attempting to access from Mexico, which is not an authorized country.

Figure 6:
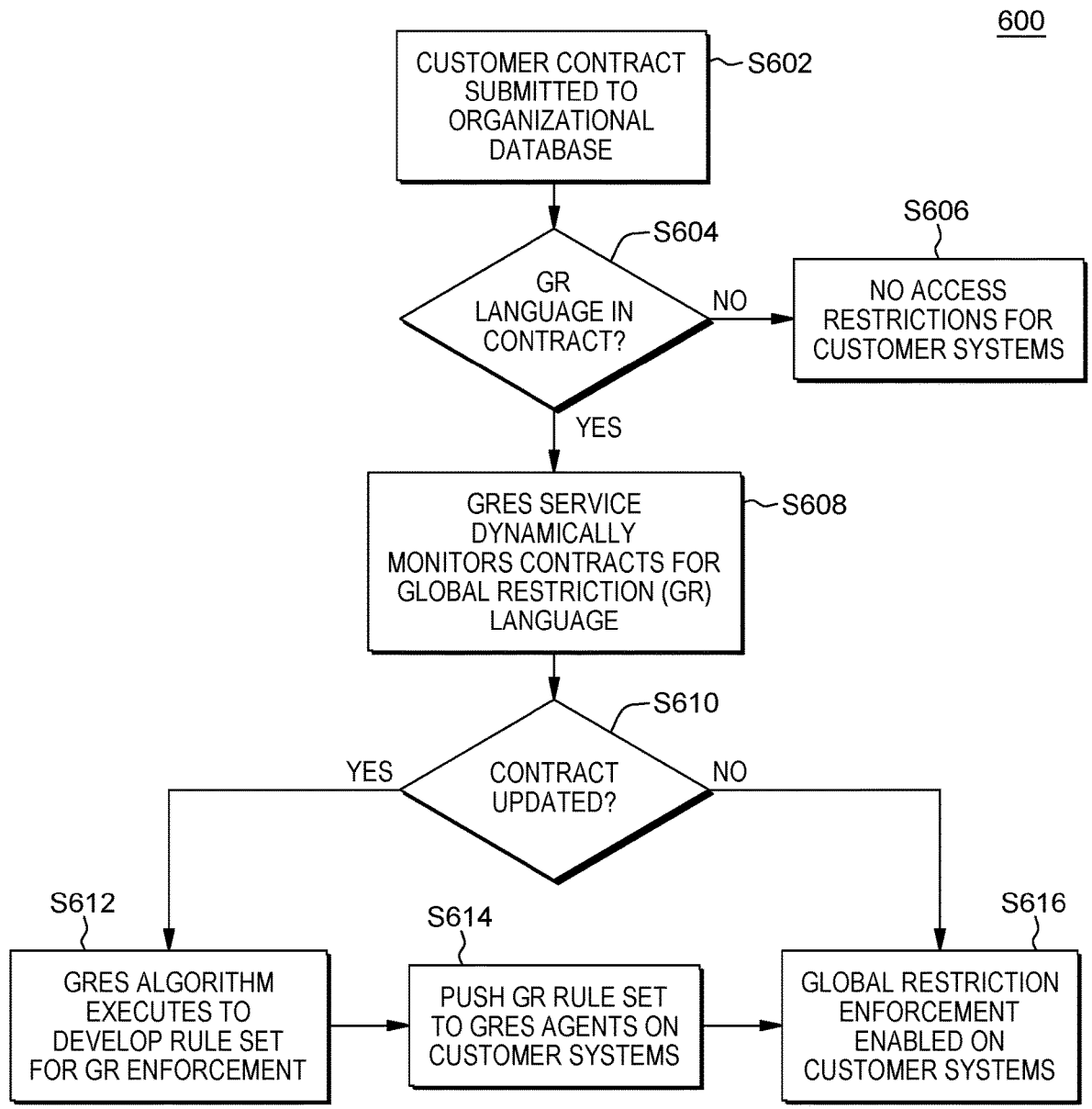
FIG. 6 is a second embodiment of a method according to the present invention.

FIG. 6 shows flow chart 600 which is a GRES Contractual Rule Set Development that illustrates how Customer Contracts are dynamically reviewed to generate the Global Restriction Rule Sets. The method of flow chart 600 includes the following operations: S602; S604; S606; S608; S610; S612; S614; and S616. Process flow among and between the operations is shown by arrows in FIG. 6.

Figure 7:
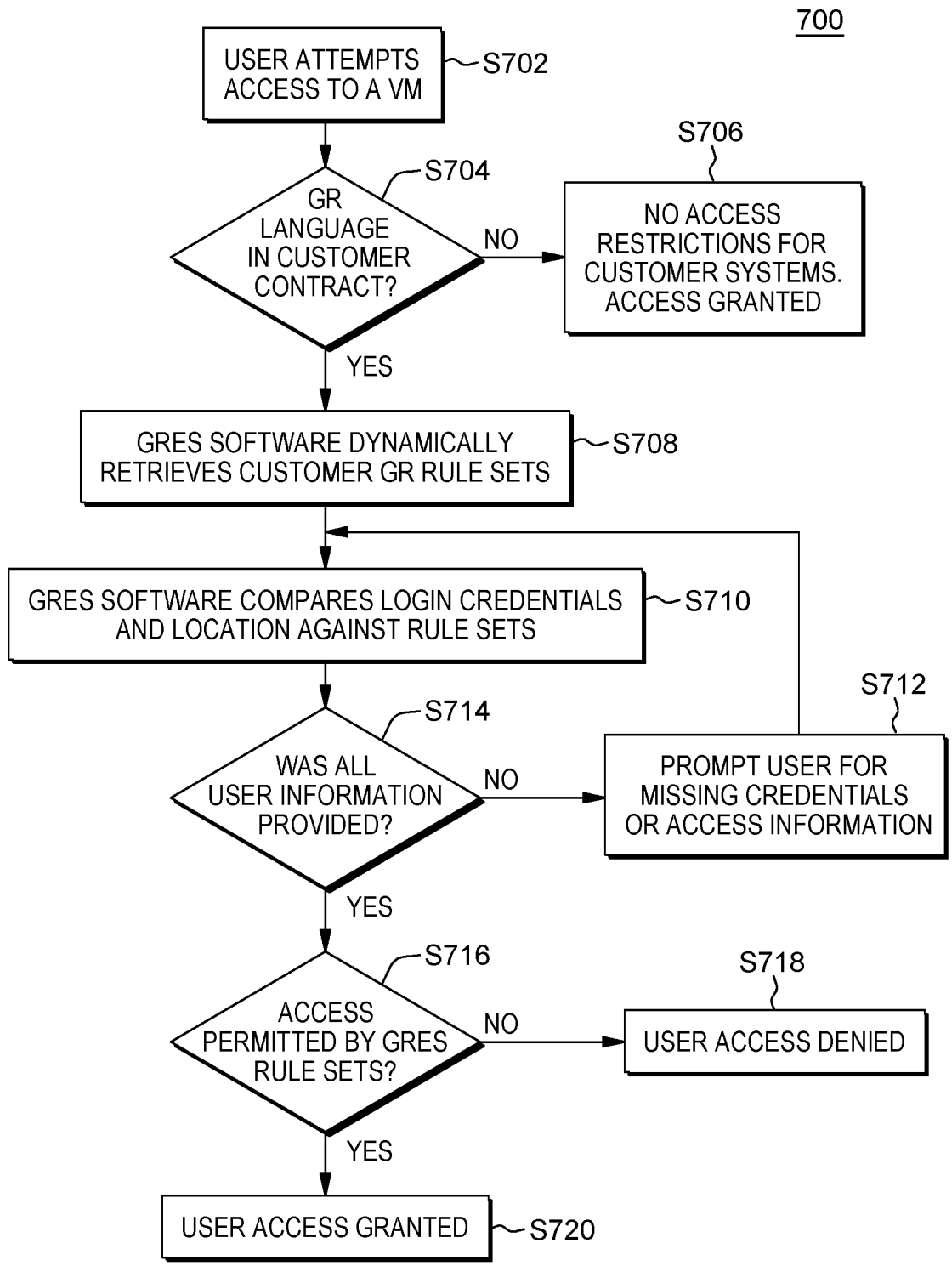
FIG. 7 is a second embodiment of a method according to the present invention.

FIG. 7 shows flow chart 700 which is a GRES Contractual Rule Set Development that illustrates how Customer Contracts are dynamically reviewed to generate the Global Restriction Rule Sets. The method of flow chart 700 includes the following operations: S702; S704; S706; S708; S710; S712; S714; S716; S718; and S720. Process flow among and between the operations is shown by arrows in FIG. 7.

In one embodiment, the method executes as follows: (i) user attempts accessing an IT resource (VM (Virtual Machine) for example); (ii) request is intercepted by GRES; (iii) GRES queries all contracts associated with VM; (note that (a) VM could be associated with multiple contracts, and/or (b) new contracts can be added to an IT resource (VM). For example, a GDPR contract could be appended to the list of contracts applicable to X number of IT resources in Europe. This would be triggered either manually by an IT admin or automatically via scripts based on some config parameters); (iv) GRES extracts the set of rules from all contracts associated with the IT resource (enabling art; for example, Watson compare & comply solution); (v) based on extracted rules, GRES identifies what user information is needed to authenticate. For example, the rules could indicate that the user has to be physically located in certain regions to access; (vi) GRES then collects user information like location, username, password, role, and other credentials (enabling art) and compares the information collected to the required rules and makes a decision whether to authenticate user or not, (a) if all the rules are satisfied by the collected information, user is authenticated and provided access, (b) if any of the rules are not satisfied, then the user is denied access, (c) if not all the required information is adequately collected, then the user is prompted to explicitly provide whatever other information is needed; and/or (vii) the method iterates if the user provides more information as required in step (v) (c) above.

In one embodiment, referencing the method described in the above paragraph, GRES has the ability to react in real time to dynamic changes in the contract(s) and associated contract language.

Some embodiments of the present invention include one, or more, of the following features, characteristics, advantages and/or operations: (i) focuses on utilizing the location of a user, which can be obtained through various enabling art, to enable enforcement of access; (ii) utilizes an ontological set of terms to develop enforceable rule sets from dynamically changing contracts and react in real-time to enforce global accessibility restrictions is not found in this piece of prior art; (iii) discloses a solution to react in real time to dynamic changes in contract(s) and associated contract language in order to enforce global accessibility restrictions; (iv) uses an ontology of terms and natural language processing to generate a plurality of permission based rules from dynamic contract(s) and government regulations; (v) interprets rule data sets to permit the implementation of enforcement of global resource accessibility to a governed computing environment; (vi) dynamically enhances rules as contract(s) and government regulations are revised; and/or (vii) applies the access restrictions of global resources in real-time by digesting the dynamic changes in regulations, contract(s), availability of systems, and increased mobility of users around the world.

Some embodiments of the present invention include one, or more, of the following features, characteristics, advantages and/or operations: (i) receiving an access management data set including a plurality of rules related permissions for accessing various kinds of data; (ii) receiving a global resource restriction data set including a plurality of global restrictions related applicable in accessing various kinds of data; (iii) generating an ontologically organized ontology of terms data set based upon the access management data set and the global resource restriction data set; (iv) receiving a contract data set including text of a natural language contract; and/or (v) dynamically identifying a first restriction to access of data based upon the contract data set and the ontology of terms data set.

Some embodiments of the present invention include one, or more, of the following features, characteristics, advantages and/or operations: (i) receiving an access management data set including a plurality of rules related permissions for accessing various kinds of data; (ii) receiving a global resource restriction data set including a plurality of global restrictions related applicable in accessing various kinds of data; (iii) generating an ontologically organized ontology of terms data set based upon the access management data set and the global resource restriction data set; (iv) receiving a government regulation data set including text of a natural language government regulation; and/or (v) dynamically identifying a first restriction to access of data based upon the government regulation data set and the ontology of terms data set.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a contract data set including information indicative of a text of a natural language contract that controls terms of access by a first set of user(s) to a first computing resource, with the natural language contract including a set of contractual geographical resource restriction(s) (CGRR(s));
applying natural language parsing to the contract data set to convert the set of CGRR(s) into a set of machine logic rule(s) that control access to the first computing resource in accordance with the set of CGRR(s);
receiving, from a device of a first user of the first set of users, a first request to access the first computing resource;
applying the machine logic rule(s) to determine whether the first user should be allowed or denied access to the first computing resource based on the set of CGRR(s);
in response to a determination that the first user should be denied access to the first computing resource based on the set of CGRR(s), denying the first request to access the first computing resource;
in response to a determination that the first user should be allowed access to the first computing resource based on the set of CGRR(s), allowing the first request to access the first computing resource.

2. The CIM of claim 1, wherein the first computing resource includes at least one of the following types of computing resources: computing resources: processing of data; short-term storage of data; long-term storage of data; access to and/or revision of stored data; streaming content; downloadable content; physical computing resources; virtualized resources; and/or software.

3. The CIM of claim 1, wherein the set of machine logic based rule includes an ontology of terms.

4. The CIM of claim 1, wherein the set of CGRR(s) include a first CGRR based on a governmental law or regulation.

5. A computer program product (CPP) comprising: a machine readable storage device; and computer code stored on the machine readable storage device, with the computer code including instructions for causing a processor(s) set to perform operations including the following:
receiving a contract data set including information indicative of a text of a natural language contract that controls terms of access by a first set of user(s) to a first computing resource, with the contract including a set of contractual geographical resource restriction(s) (CGRR(s)), applying natural language parsing to the contract data set to convert the set of CGRR(s) into a set of machine logic rule(s) that control access to the first computing resource in accordance with the set of CGRR(s), receiving, from a device of a first user of the first set of users, a first request to access the first computing resource;

applying the machine logic rule(s) to determine whether the first user should be allowed or denied access to the first computing resource based on the set of CGRR(s);

in response to a determination that the first user should be denied access to the first computing resource based on the set of CGRR(s), denying the first request to access the first computing resource;

in response to a determination that the first user should be allowed access to the first computing resource based on the set of CGRR(s), allowing the first request to access the first computing resource.

6. The CPP of claim 5, wherein the first computing resource includes at least one of the following types of computing resources: computing resources: processing of data; short-term storage of data; long-term storage of data; access to and/or revision of stored data; streaming content; downloadable content; physical computing resources; virtualized resources; and/or software.

7. The CPP of claim 5, wherein the set of machine logic based rule includes an ontology of terms.

8. The CPP of claim 5, wherein the set of CGRR(s) include a first CGRR based on a governmental law or regulation.

9. A computer system (CS) comprising:
a processor(s) set; a machine readable storage device; and computer code stored on the machine readable storage device, with the computer code including instructions for causing the processor(s) set to perform operations including the following:

receiving a contract data set including information indicative of a text of a natural language contract that controls terms of access by a first set of user(s) to a first computing resource, with the contract including a set of contractual geographical resource restriction(s) (CGRR(s)), applying natural language parsing to the contract data set to convert the set of CGRR(s) into a set of machine logic rule(s) that control access to the first computing resource in accordance with the set of CGRR(s), receiving, from a device of a first user of the first set of users, a first request to access the first computing resource;

applying the machine logic rule(s) to determine whether the first user should be allowed or denied access to the first computing resource based on the set of CGRR(s);

in response to a determination that the first user should be denied access to the first computing resource based on the set of CGRR(s), denying the first request to access the first computing resource;

in response to a determination that the first user should be allowed access to the first computing resource based on the set of CGRR(s), allowing the first request to access the first computing resource.

10. The CS of claim 9, wherein the first computing resource includes at least one of the following types of computing resources: computing resources: processing of data; short-term storage of data; long-term storage of data; access to and/or revision of stored data; streaming content; downloadable content; physical computing resources; virtualized resources; and/or software.

11. The CS of claim 9, wherein the set of machine logic based rule includes an ontology of terms.

12. The CS of claim 9, wherein the set of CGRR(s) include a first CGRR based on a governmental law or regulation.

* * * * *